US011749088B2

(12) United States Patent
Hirabayashi et al.

(10) Patent No.: US 11,749,088 B2
(45) Date of Patent: Sep. 5, 2023

(54) FAILURE INFORMATION ANNOUNCEMENT DEVICE AND FAILURE INFORMATION ANNOUNCEMENT METHOD

(71) Applicant: Nippon Telegraph and Telephone Corporation, Tokyo (JP)

(72) Inventors: Atsushi Hirabayashi, Musashino (JP); Atsushi Takada, Musashino (JP); Kosuke Sakata, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 106 days.

(21) Appl. No.: 17/427,981

(22) PCT Filed: Jan. 24, 2020

(86) PCT No.: PCT/JP2020/002435
§ 371 (c)(1),
(2) Date: Aug. 3, 2021

(87) PCT Pub. No.: WO2020/162215
PCT Pub. Date: Aug. 13, 2020

(65) Prior Publication Data
US 2022/0122443 A1    Apr. 21, 2022

(30) Foreign Application Priority Data
Feb. 7, 2019  (JP) .................. 2019-020589

(51) Int. Cl.
*G08B 21/12* (2006.01)
*G08B 21/18* (2006.01)

(52) U.S. Cl.
CPC .................. *G08B 21/18* (2013.01)

(58) Field of Classification Search
USPC ......... 340/540, 426.15, 426.19, 426.25, 436, 340/438, 457, 507, 511, 519, 539.13,
(Continued)

(56) References Cited

U.S. PATENT DOCUMENTS

| 6,212,167 B1 * | 4/2001 | Tada ................ H04J 3/085 370/242 |
| 2009/0015400 A1 * | 1/2009 | Breed ............... G07C 9/28 340/539.22 |

(Continued)

FOREIGN PATENT DOCUMENTS

| JP | H00548717 | 2/1993 |
| JP | H06177968 | 6/1994 |

(Continued)

*Primary Examiner* — Daniel Previl
(74) *Attorney, Agent, or Firm* — Fish & Richardson P.C.

(57) ABSTRACT

Service failure information can be quickly and accurately disseminated to appropriate targets. A service failure information dissemination system 1 receives alarm information notifying that a failure has occurred in a service or a device for providing a service and related information that relates to the alarm information, obtains the degree of influence of the failure for each service type based on the alarm information and the related information, determines a dissemination target and a dissemination means of failure information based on the degree of influence, creates failure information according to the dissemination means, and disseminates the failure information to the dissemination target through the dissemination means.

12 Claims, 2 Drawing Sheets

(58) Field of Classification Search
USPC .......................................... 340/539.24, 587
See application file for complete search history.

(56) References Cited

U.S. PATENT DOCUMENTS

| | | | |
|---|---|---|---|
| 2012/0146851 A1* | 6/2012 | Fernandez | G01S 19/02 |
| | | | 342/357.58 |
| 2013/0073912 A1* | 3/2013 | Yoshida | G06Q 10/06395 |
| | | | 714/47.1 |
| 2016/0218914 A1* | 7/2016 | Astigarraga | H04L 41/0686 |

FOREIGN PATENT DOCUMENTS

| | | |
|---|---|---|
| JP | H06232968 | 8/1994 |
| JP | H10229396 | 8/1998 |
| JP | 2004364154 | 12/2004 |
| JP | 2013030826 | 2/2013 |

\* cited by examiner

FAILURE INFORMATION ANNOUNCEMENT DEVICE AND FAILURE INFORMATION ANNOUNCEMENT METHOD

CROSS-REFERENCE TO RELATED APPLICATIONS

This application is a National Stage application under 35 U.S.C. § 371 of International Application No. PCT/JP2020/002435, having an International Filing Date of Jan. 24, 2020, which claims priority to Japanese Application Serial No. 2019-020589, filed on Feb. 7, 2019. The disclosure of the prior application is considered part of the disclosure of this application, and is incorporated in its entirety into this application.

TECHNICAL FIELD

The present invention relates to a technique for disseminating failure information when a failure has occurred.

BACKGROUND ART

When a failure has occurred in a network service, it is very important to accurately and quickly disseminate information on content of the failure to service users in order to gain the trust of service users in terms of service quality. Depending on the content of the failure, it is also necessary to notify media and regulatory agencies of information on the content of the failure.

PTL 1 discloses a technique for identifying an affected line when a failure has occurred in communication network equipment and notifying a line handling operation system of equipment monitoring information including the affected line information.

CITATION LIST

Patent Literature

[PTL 1] Japanese Patent Application Publication No. H06-232968

SUMMARY OF THE INVENTION

Technical Problem

However, the technique of PTL 1 has a problem that dissemination content is only information on an affected line or an affected device and information on content considering the influence upon services can be provided only partially. Further, dissemination targets in the technique of PTL 1 are subscribers of the affected line and do not include any others. Furthermore, PTL 1 does not mention a dissemination means.

Currently used methods for disseminating information on a failure of a service when the failure has occurred include, for example, creating and posting a webpage describing content of the failure, creating and sending emails to media and regulatory agencies, and disseminating information through internal telephone conferences. These all involve an operator's work and there is a demand for more efficient operation.

The present invention has been made with the foregoing in view and it is an object of the present invention to quickly and accurately disseminate service failure information to appropriate targets.

Means for Solving the Problem

A failure information dissemination device according to the present invention includes an alarm receiver that receives alarm information notifying that a failure has occurred in a service or a device for providing a service and related information that relates to the alarm information, a dissemination handling determination unit that obtains a degree of influence of the failure for each service based on the alarm information and the related information and determines a dissemination target and a dissemination means of failure information relating to the failure based on the degree of influence, and a failure information dissemination unit that disseminates the failure information to the dissemination target through the dissemination means.

A failure information dissemination method according to the present invention includes the steps of receiving alarm information notifying that a failure has occurred in a service or a device for providing a service and related information that relates to the alarm information, obtaining a degree of influence of the failure for each service based on the alarm information and the related information, determining a dissemination target and a dissemination means of failure information relating to the failure based on the degree of influence, and disseminating the failure information to the dissemination target through the dissemination means.

Effects of the Invention

According to the present invention, service failure information can be quickly and accurately disseminated to appropriate targets.

DESCRIPTION OF EMBODIMENTS

Hereinafter, embodiments of the present invention will be described with reference to the drawings.

Figure 1:
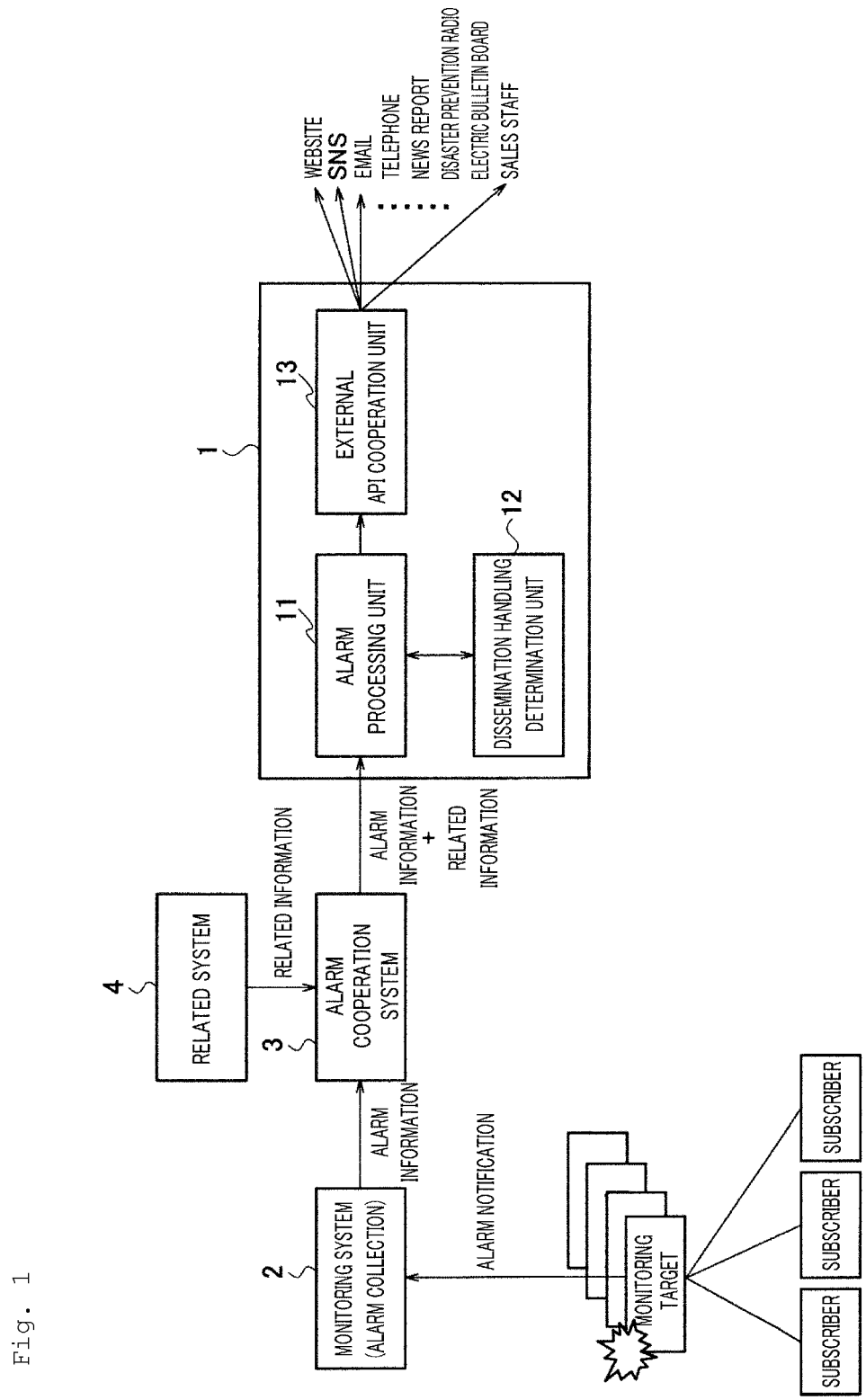
FIG. 1 is an overall configuration diagram including a service failure information dissemination system of the present embodiment.

A system shown in FIG. 1 detects a failure that has occurred in a network service, determines dissemination targets and dissemination means of failure information based on the influence of the failure upon the network service, and creates and disseminates dissemination content according to the dissemination means. The system shown in FIG. 1 includes a service failure information dissemination system 1, a monitoring system 2, an alarm cooperation system 3, and a related system 4.

The monitoring system 2 collects alarm notifications (alarms) indicating that an abnormality has occurred from a device used for providing a network service, a device for monitoring a network service, or the like, and transmits the collected alarms to the alarm cooperation system 3 as alarm information. For example, the alarms collected by the monitoring system 2 include an alarm indicating that a failure has occurred in a service, an alarm indicating that a failure has occurred in resources for providing a service, and the like.

The alarm cooperation system 3 receives alarm information from the monitoring system 2 and acquires related information which relates to the received alarm information from the related system 4. The alarm cooperation system 3 sorts and selects alarm information and related information to be transmitted to the service failure information dissemination system 1 based on the alarm information and the related information and transmits the alarm information and the related information to the service failure information dissemination system 1. For example, the alarm cooperation system 3 selects primary alarm information which is a cause of other alarm information and secondary alarm information which has been issued due to the primary alarm information, and gathers the alarm information for one event. The alarm cooperation system 3 obtains related information, such as that of resources or services relating to an event identified by the received alarm information, from the related system 4, and transmits the alarm information and the related information to the service failure information dissemination system 1.

The related system 4 provides the alarm cooperation system 3 with related information that relates to the alarm information and that is needed for the service failure information dissemination system 1 to determine the necessity of dissemination, dissemination targets, or the like. For example, the related system 4 provides the alarm cooperation system 3 with subscriber information, device information, network information, construction information, accident information, handling history information, or the like. The related system 4 may provide information about services that are influenced when a failure has occurred in resources.

The service failure information dissemination system 1 determines the influence upon the service availability of subscribers for each service type based on the alarm information and the related information and determines whether or not it is necessary to disseminate the failure information. For example, the service failure information dissemination system 1 determines that it is unnecessary to disseminate the failure information when the service has already been restored and there is no influence upon provision of the service although the alarm information has been received. In this case, the service failure information dissemination system 1 may also determine that it is necessary to disseminate failure information indicating that a failure has occurred.

When dissemination is necessary, the service failure information dissemination system 1 specifies dissemination targets and dissemination means for disseminating the failure information based on the degree of influence of the service failure and creates dissemination content that is to be disseminated through the dissemination means. For example, the degree of influence of the service failure is obtained from the number of affected subscribers, the affected area, the affected time, the presence or absence of an important line, or the like. The dissemination targets include affected subscribers, all subscribers, sales staff, regulatory agencies, or the like. The dissemination means include a website, SNS, email, telephone, a news report, disaster prevention radio, an electric bulletin board, and contact with sales staff. The dissemination targets and the dissemination means are not limited to these.

The service failure information dissemination system 1 cooperates with an API provided by the dissemination means and disseminates created dissemination content to the dissemination targets. For example, the service failure information dissemination system 1 transmits messages to the dissemination targets using the API provided by the SNS.

Next, a configuration of the service failure information dissemination system 1 will be described.

The service failure information dissemination system 1 of FIG. 1 includes an alarm processing unit 11, a dissemination handling determination unit 12, and an external API cooperation unit 13. Each unit of the service failure information dissemination system 1 may be configured by a computer including an arithmetic processing unit, a storage device, and the like and the processing of each unit may be executed by a program. This program is stored in a storage device included in the service failure information dissemination system 1 and can be recorded on a recording medium such as a magnetic disk, an optical disc, or a semiconductor memory or can be provided through a network.

The alarm processing unit 11 receives the alarm information and the related information from the alarm cooperation system 3 and transmits the received alarm information and related information to the dissemination handling determination unit 12. The alarm processing unit 11 also receives information regarding the dissemination targets and the dissemination means specified by the dissemination handling determination unit 12 and dissemination content to be disseminated through the dissemination means and transmits the received information and dissemination content to the external API cooperation unit 13.

The dissemination handling determination unit 12 obtains the degree of influence upon the service availability of subscribers from the alarm information and the related information for each service type and determines the necessity of dissemination based on the degree of influence. Upon determining that the dissemination is necessary, the dissemination handling determination unit 12 determines dissemination targets and a dissemination means for each dissemination target based on the degree of influence and automatically creates dissemination content for each pair of the dissemination target and means.

The external API cooperation unit 13 uses an API provided by the dissemination means to disseminate the dissemination content to the dissemination target.

Figure 2:
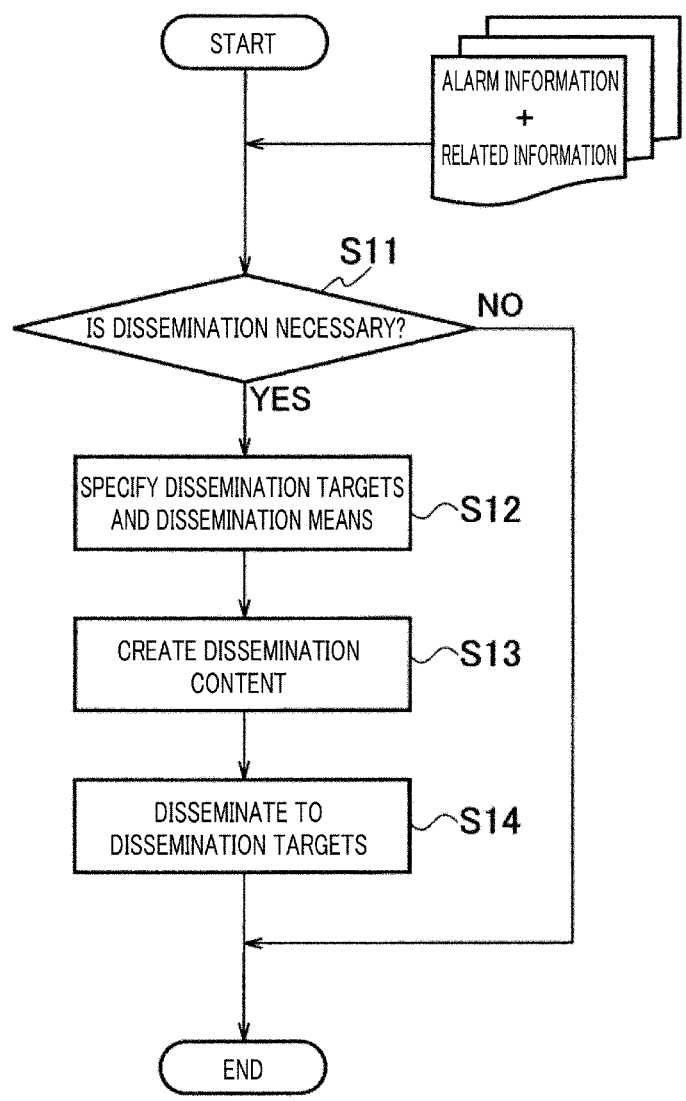
FIG. 2 is a flowchart showing a processing flow of the service failure information dissemination system.

Processing of the service failure information dissemination system 1 of the present embodiment will be described with reference to a flowchart of FIG. 2.

When the alarm processing unit 11 has received the alarm information and the related information, the dissemination handling determination unit 12 determines the influence upon the service availability of subscribers from the alarm information and the related information for each service type and determines whether it is necessary to disseminate the service failure information (step S11). The dissemination handling determination unit 12 obtains, for each service type, the degree of influence quantized, for example, based on a failure location (device name or location in the device), content of the failure, a failure occurrence time, an elapsed time, device information (such as a relevant service, a device configuration, a connection status, presence/absence of a redundant configuration, or a switching status), network information (such as presence/absence of a redundant configuration or a switching status), a subscriber accommodation status, an opposite device status, a U-plane traffic status, and a congestion occurrence status included in the alarm information and the related information and determines the necessity of disseminating the service failure information.

The dissemination handling determination unit 12 ends the processing for each service type for which it has determined that it is unnecessary to disseminate the service failure information.

The dissemination handling determination unit 12 specifies dissemination targets and a dissemination means for each dissemination target for each service type for which it has determined that it is necessary to disseminate the service failure information (step S12). The dissemination handling determination unit 12 specifies dissemination targets and dissemination means, for example, based on scale information of influenced subscribers and individual information of the influenced subscribers (such as IDs, accommodation devices, attributes, and presence/absence of prior application for individual dissemination). To give a specific example, service failure information is disseminated to all subscribers by posting it on a website. The dissemination targets are all subscribers and the dissemination means is posting on the website. If an attribute of an influenced subscriber is that it is a corporation or an important line, sales staff is added to the dissemination targets. An administrative agency and a disaster countermeasure organization to which the service failure information is to be disseminated are specified based on the conditions of the influenced range, the influenced time, or the like. Individual dissemination through an individual dissemination means is performed for each subscriber who has applied for individual dissemination in advance.

The dissemination handling determination unit 12 automatically creates dissemination content for each dissemination means (step S13). The dissemination handling determination unit 12 creates the dissemination content by applying parameters (such as an occurrence time, affected content of the service, the affected range and scale of the service, the cause of occurrence, and handling history) to text of a template (a first report/Xth report/recovery report). For example, when the dissemination means is a website, the dissemination handling determination unit 12 creates a webpage to be posted on the website by applying parameters to a template webpage. When the dissemination means is email, the dissemination handling determination unit 12 creates a message to be sent by applying an email address to which the service failure information is to be disseminated as the destination of the email and applying parameters to a template body of the email. The dissemination handling determination unit 12 may also create dissemination content in a general-purpose format such as CSV that is compatible with the API.

The external API cooperation unit 13 disseminates the dissemination content created in step S13 for each dissemination target using the dissemination means (step S14). For example, when the dissemination means is a website, the external API cooperation unit 13 uploads a webpage created in step S13 to the website. When the dissemination means is email, the external API cooperation unit 13 cooperates with an email server to send an email created in step S13 to the dissemination target.

According to the present embodiment, the service failure information dissemination system 1 receives alarm information notifying that a failure has occurred in a service or a device for providing a service and related information that relates to the alarm information as described above. Then, the service failure information dissemination system 1 obtains the degree of influence of the failure for each service type based on the alarm information and the related information, determines a dissemination target and a dissemination means of failure information based on the degree of influence, creates failure information according to the dissemination means, and disseminates the failure information to the dissemination target through the dissemination means. This allows failure information to be quickly and accurately disseminated to appropriate targets.

REFERENCE SIGNS LIST

1 Service failure information dissemination system
11 Alarm processing unit
12 Dissemination handling determination unit
13 External API cooperation unit
2 Monitoring system
3 Alarm cooperation system
4 Related system

The invention claimed is:

1. A failure information dissemination device comprising:
   an alarm receiver configured to receive alarm information notifying that a failure has occurred in a service or a device for providing a service and related information that relates to the alarm information;
   a dissemination handling determination unit, including one or more processors, configured to:
      obtain a degree of influence of the failure for each service based on the alarm information and the related information,
      determine whether to disseminate failure information relating to the failure based on the degree of influence, and
      in response to determining to disseminate the failure information, determine a dissemination target and a dissemination means of the failure information relating to the failure based on the degree of influence; and
   a failure information dissemination unit, including one or more processors, configured to disseminate the failure information to the dissemination target through the dissemination means.

2. The failure information dissemination device according to claim 1, wherein the dissemination handling determination unit is configured to create the failure information according to the dissemination means.

3. The failure information dissemination device according to claim 1, wherein the failure information dissemination unit is configured to cooperate with an external device corresponding to the dissemination means to disseminate the failure information.

4. The failure information dissemination device according to claim 1, wherein the degree of influence is obtained from a number of affected subscribers, data indicative of an affected area, data indicative of an affected area, and data indicative of an affective time.

5. The failure information dissemination device according to claim 1, wherein the dissemination handling determination unit is configured to determine whether to disseminate the failure information relating to the failure based on the degree of influence further comprises:
   determine the failure that has occurred in the service or in the device for providing the service has been restored;
   in response to determine the failure has been restored, determine to not disseminate the failure information relating to the failure based on the degree of influence; and
   in response to determining to not disseminate the failure information, determine to cease processing associated with the failure.

6. The failure information dissemination device according to claim 1, wherein the dissemination means comprises at least one of a website, an email, telephone, a news report, a disaster prevention radio, and an electric bulletin board.

7. A failure information dissemination method comprising:
   receiving alarm information notifying that a failure has occurred in a service or a device for providing a service and related information that relates to the alarm information;

obtaining a degree of influence of the failure for each service based on the alarm information and the related information;

determining whether to disseminate failure information relating to the failure based on the degree of influence;

in response to determining to disseminate the failure information, determining a dissemination target and a dissemination means of the failure information relating to the failure based on the degree of influence; and disseminating the failure information to the dissemination target through the dissemination means.

8. The failure information dissemination method according to claim 4, further comprising: creating the failure information according to the dissemination means.

9. The failure information dissemination method according to claim 4, further comprising: cooperating with an external device corresponding to the dissemination means to disseminate the failure information.

10. A non-transitory computer readable medium storing one or more instructions causing a computer to execute:

receiving alarm information notifying that a failure has occurred in a service or a device for providing a service and related information that relates to the alarm information;

obtaining a degree of influence of the failure for each service based on the alarm information and the related information;

determining whether to disseminate failure information relating to the failure based on the degree of influence;

in response to determining to disseminate the failure information, determining a dissemination target and a dissemination means of the failure information relating to the failure based on the degree of influence; and disseminating the failure information to the dissemination target through the dissemination means.

11. The non-transitory computer readable medium according to claim 7, further comprising: creating the failure information according to the dissemination means.

12. The non-transitory computer readable medium according to claim 7, further comprising: cooperating with an external device corresponding to the dissemination means to disseminate the failure information.

\* \* \* \* \*